UNITED STATES PATENT OFFICE.

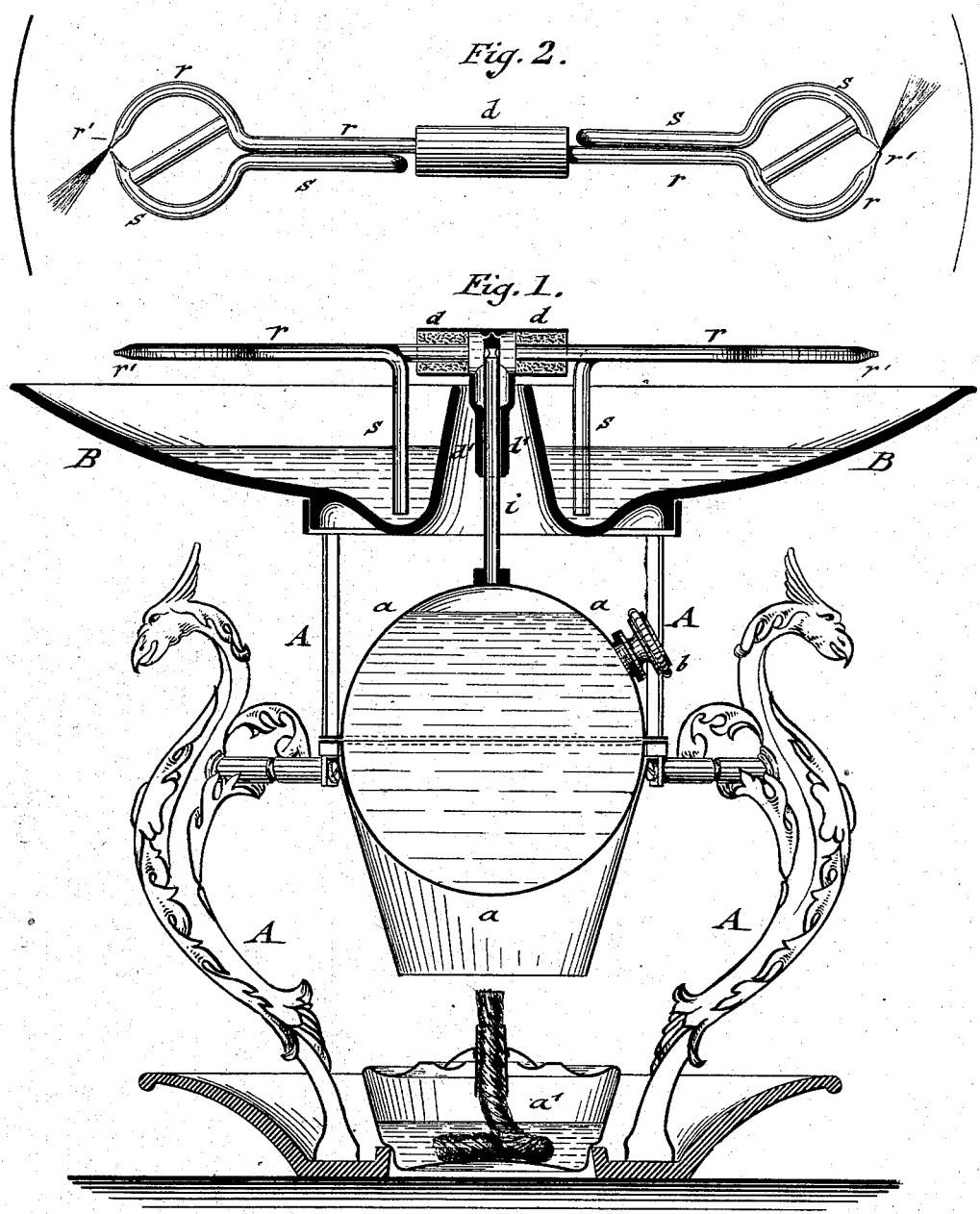

PAUL LOCHMANN, OF SCHKENDITZ, PRUSSIA, GERMANY.

ATOMIZER.

SPECIFICATION forming part of Letters Patent No. 254,988, dated March 14, 1882.

Application filed December 19, 1881. (No model.)

*To all whom it may concern:*

Be it known that I, PAUL LOCHMANN, of the city of Schkenditz, in the Kingdom of Prussia, in the German Empire, have invented Improvements in Atomizing Apparatus, of which the following is a specification.

This invention relates to an improved atomizing apparatus by which water, medicinal preparations, perfumery, and, in short, liquids of all kinds may be distributed in a fine spray and over a considerable area.

The invention consists of a steam-generating vessel, which is arranged below a flat basin and connected by an upright tube to two or more radial tubes having steam-exit nozzles. Along the steam-tubes are arranged suction-tubes, the nozzles of which are in close proximity to the nozzles of the steam-tubes, while their inner ends extend downward into the basin and lift the liquid, so as to distribute it in a fine spray with the steam.

In the accompanying drawings, Figure 1 represents a vertical central section of my improved atomizing apparatus, and Fig. 2 is a plan view of the same.

Similar letters of reference indicate corresponding parts.

A represents the supporting-frame of my improved atomizing apparatus, said frame carrying a steam-generator composed of a vessel, $a$, containing water, and of an alcohol-lamp or other source of heat, $a'$, below the same.

The steam-generating vessel $a$ is provided with an opening closed by a screw cap or plug, $b$, for filling the vessel with water from time to time, as required. From this vessel $a$ extends a vertical tube, $i$, the upper end of which carries by a conical bearing the coupling-sleeve $d$, into which two or more radial atomizing-tubes, $r$, are inserted. The sleeve $d$ is steadied on the tube $i$ by a downwardly-extending tube, $d'$, as shown in Fig. 1. The steam passes to the tube $r$ by holes in the tube $i$, below the pointed end of the same. The liquid to be atomized is placed into a flat annular basin, B, which is supported by the frame A above the generator $a$, the liquid being conducted from the deepest points of the bowl by suction-tubes $s$ to the nozzles $r'$ of the steam-tubes $r$. As soon as steam is ejected through the nozzles $r'$ the tubes $r$ are set in motion, and with them the suction-tubes $s$, which are attached thereto. The liquid in the basin B is thereby drawn up, taken up by the steam, and thrown off in a fine spray therewith.

The nozzles of the tubes $r$ and $s$ are arranged at a suitable angle of inclination to the radial portions of the tubes $r$ and $s$, so that the steam exerts a propelling action thereon, whereby the rotary motion of the atomizing-tubes, as well as a uniform distribution of the vapors in a large circular path, is accomplished. As the suction-tubes $s$ are applied to the steam-tubes $r$ and rotated therewith a uniform supply of the liquid to be atomized is kept throughout the rotation of the atomizing-tubes.

Having thus described my invention, I claim as new and desire to secure by Letters Patent—

1. The combination of a steam-generating vessel, $a$, having a connecting-tube, $i$, a basin, B, for the liquid to be atomized, radial steam-tubes $r$ $r$, communicating with the tube $i$, and suction-tubes $s$, the latter extending from the basin to the nozzles of the steam-tubes, substantially as set forth.

2. The combination of a steam-generating vessel, $a$, an upright connecting-tube, $i$, having a top bearing and openings below the same, a coupling-sleeve, $d$ $b'$, radial steam-tubes $r$ $r'$, secured to the sleeve, and suction-tubes $s$, extending from the basin to the nozzles of the steam-tubes $r$ $r'$, substantially as set forth.

In testimony whereof I have signed my name to this specification in the presence of two subscribing witnesses.

PAUL LOCHMANN.

Witnesses:
R. LAIRD COLLIER,
FRED. WILKIE.